United States Patent [19]

Quante

[11] 4,432,954
[45] Feb. 21, 1984

[54] PRODUCTION OF GYPSUM HEMIHYDRATE WITH WASTE HEAT, AQUEOUS H₂SO₄ AND SULFURIC ACID SALTS

[75] Inventor: Heinrich Quante, Behringstr. 23, 4350 Recklinghausen, Fed. Rep. of Germany

[73] Assignee: Heinrich Quante, Recklinghausen, Fed. Rep. of Germany

[21] Appl. No.: 283,006

[22] Filed: Jul. 13, 1981

[30] Foreign Application Priority Data

Jul. 14, 1980 [AT] Austria ............................... 3658/80
Feb. 17, 1981 [DE] Fed. Rep. of Germany ....... 3105709
May 5, 1981 [DE] Fed. Rep. of Germany ....... 3117641

[51] Int. Cl.³ ...................... C04B 11/00; C04B 11/02; C01F 11/46
[52] U.S. Cl. .................................. 423/171; 423/555; 106/110
[58] Field of Search ............... 423/555, 170, 171, 172; 106/109, 110

[56] References Cited

U.S. PATENT DOCUMENTS

| 2,216,402 | 10/1940 | Müller | 423/555 |
| 3,437,330 | 3/1948 | Worner | 423/172 |
| 3,855,391 | 12/1974 | Selmeczi et al. | 423/171 |
| 4,091,080 | 5/1978 | Kosuigi et al. | 423/555 |
| 4,136,998 | 1/1979 | Bassier et al. | 423/555 |
| 4,156,712 | 5/1979 | Kanai et al. | 423/555 |
| 4,210,626 | 7/1980 | Berrie et al. | 423/555 |

FOREIGN PATENT DOCUMENTS

| 12487 | 6/1980 | European Pat. Off. | 423/555 |
| 2727544 | 1/1979 | Fed. Rep. of Germany | 423/555 |
| 53-51199 | 5/1978 | Japan | 423/171 |
| 53-67693 | 6/1978 | Japan | 423/555 |
| 53-73495 | 6/1978 | Japan | 423/555 |
| 1101771 | 1/1968 | United Kingdom | 423/170 |
| 1545788 | 5/1979 | United Kingdom | 423/171 |

OTHER PUBLICATIONS

Olsen, John C. Unit processes and Principles of Chemical Engineering, D. Van Nostrand Co. New York, NY 1932 pp. 1–3.

Primary Examiner—Gary P. Straub
Attorney, Agent, or Firm—Karl F. Ross

[57] ABSTRACT

Alpha gypsum hemihydrate is obtained by calcining calcium sulfate dihydrate, generated with flue-gas desulfurization of power plants or by chemical process, e.g. in the production of phosphoric acid. The calcining process comprises producing initially a dispersion from calcium sulfate dihydrate and diluted, sulfuric acid solution and heating same at a predetermined rate to about 373 K with industrial, dust-free waste heat, whereupon the solid components are separated from the aqueous sulfuric acid and are dried. An alpha gypsum hemihydrate practically free from anhydrite II is obtained from a solution of sulfuric salts in the diluted sulfuric acid. An addition of magnesium oxide yields a hemihydrate with a high degree of fineness and avoids blooming effects.

6 Claims, 2 Drawing Figures

PRODUCTION OF GYPSUM HEMIHYDRATE WITH WASTE HEAT, AQUEOUS $H_2SO_4$ AND SULFURIC ACID SALTS

FIELD OF THE INVENTION

My present invention relates to a process for the production of alpha gypsum hemihydrate, in particular for the calcining of the calcium sulfate dihydrate generated upon flue-gas desulfurization of power plants or of a chemical gypsum. In addition, the invention relates to a plant for performing the process.

BACKGROUND OF THE INVENTION

In view of the ever more stringent environmental regulations, the requirements relating to the desulfurization of flue gas have become ever more exacting, in particular regarding the combustion of coal in power plants. Numerous processes are known where sulfur is to be bound by employing limestone and similar materials (German laid-open application Nos. 27 08 984 and 27 30 707). The flue-gas gypsum produced with these prior methods, however, cannot be stored nor be further used in the form obtained. Therefore, it is transformed by heat input into the so-called gypsum hemihydrate. This material can be employed for various purposes in the construction industry as well as, under certain conditions, for dam building in underground mining (German printed specification No. 29 08 266). The large consumption of energy for the conventional transformation of the dihydrate into the hemihydrate is disadvantageous. This holds also for the process known from German Pat. No. 12 38 374 according to which an aqueous suspension of calcium sulfate dihydrate is heated at a predetermined rate to a high final temperature. A disadvantageous aspect of this known process resides in the need for seed crystals and the employment of an autoclave.

Considerable amounts of waste heat are generated in power plants, especially in those where the resulting flue-gas gypsum cannot be utilized without additional treatment, this heat being uselessly transferred to the atmosphere. In addition to power plants, the chemical industry, steel plants and other branches of industry also give rise to a substantial amount of waste heat which is utilized only insufficiently or not at all.

The waste heat referred to is produced at about 130° C. in such power plants and could go as high as 140° C. in older installations. It is disadvantageous that this heat, on account of its relatively low temperatures and its character, cannot be used in the order of magnitude in which it is generated.

OBJECTS OF THE INVENTION

Therefore, it is an object of my present invention to provide a technically simple, quasi-continuous and economical method, integrable into conventional processes, of calcining flue-gas gypsum, chemical gypsum, natural gypsum and similar materials.

A related object is to provide a plant for implementing this novel method.

GENERAL DESCRIPTION OF THE INVENTION

In accordance with my present invention, alpha gypsum hemihydrate is obtained by producing a dispersion of calcium sulfate dihydrate of very fine granulometry in aqueous sulfuric acid and elevating the temperature of that dispersion at a predetermined rate, with the aid of dust-free industrial waste heat, to a level of 90°–100° C. whereupon the solid components are separated from the aqueous sulfuric acid and are subsequently dried at 105°–130° C.

I have surprisingly found that with such a process the waste heat generated at about 130° C. can be usefully employed. Furthermore, the quantities of gypsum produced in modern flue-gas-desulfurization plants, amounting to 70,000–100,000 tons per year and more, are so large that the generated waste heat can be utilized almost entirely for the production of gypsum hemihydrate from the flue-gas gypsum. To the extent that other branches of industry also generate waste heat and flue-gas gypsum, chemical gypsum and natural gypsum, the process can be realized there in the same manner. With the use of sulfuric acid, the transformation process can be performed at the temperatures stated; the released water of crystallization initially causes a dilution of the dispersion. Further feeding in of waste heat leads to evaporation of the water from the dispersion and with it to a regeneration of the aqueous sulfuric acid up to its original concentration.

I have further found that the viscosity of the dispersion increases during the calcining procedure on account of a change in crystal structure whereby the bubbling of hot gas therethrough is significantly impaired and heat transfer is impeded. This results mainly from the fact that the blown-in heating gas merges early into larger bubbles, which permit only a small heat transfer. In order to maintain the heat transfer, a feature of my invention resides in separately heating the aqueous sulfuric acid with evaporation of the water of crystallization that is released in the dissociation reaction; the calcium sulfate dihydrate is then introduced into the hot aqueous sulfuric acid. The aqueous sulfuric acid can be recirculated, as known per se, except that the regeneration occurs in a special processing phase either before or after the calcination. In this context it is advantageous that, in the calcination of the calcium sulfate dihydrate to the alpha calcium sulfate hemihydrate, the overall reaction is on balance weakly exothermic reaction is utilized so that less waste heat needs to be fed in. The heating of the aqueous sulfuric acid and the evaporation of the free water of crystallization are performed separately, the heat required for the evaporation being provided by feeding waste heat into the dispersion medium remaining after the separation of the alpha calcium sulfate hemihydrate.

For further optimization of the procedure I prefer to heat the aqueous sulfuric acid to such an extent that upon introduction of the calcium sulfate dihydrate at least the dissociation temperature is established. This shortens the processing by assuring a complete compensation of the temperature loss caused by the introduction of the calcium sulfate dihydrate at normal temperature into the dispersion medium. The dissociation reaction is favored by the continuous formation of small bubbles of the introduced waste-heat carrier.

In order to assure an optimum heat transfer also in the separate process step of heating the dispersion medium remaining after the separation of the calcium sulfate hemihydrate, my invention further provides that the waste-heat carrier is introduced during the heating of the aqueous sulfuric acid in the same direction of flow and at a correlated flow velocity. This will effectively delay the formation of larger bubble configurations so that the desired favorable heat transfer with small bubbles is maintained.

According to another feature of my invention, the calcium sulfate dihydrate is fed into the aqueous sulfuric acid serving as the reaction medium until a final acid concentration of 10 to 50 weight percent, preferably 15 to 25 weight percent, is reached. Advantageously, the calcium sulfate dihydrate is introduced with continuous stirring into the sulfuric acid in order to obtain a uniform mixture.

The production of the necessary dispersion and a satisfactory processing are assured if the concentration of sulfuric acid in the aqueous medium ranges from 15 to 55 weight percent; a preferred value is 20 weight percent. Calcium sulfate dihydrate is then introduced into this diluted sulfuric acid.

Usually, waste heat is carried by steam or hot air, either of them being suitable for the process. Advantageously, the present calcining process utilizes steam for the direct and/or indirect heating of the aqueous sulfuric acid and/or of the mixture with maintenance of a heating rate of 1 to 3 K/min, preferably 1.5 K/min. The heating rate is conventionally controlled by the setting of valves. More particularly, I have found it advantageous to maintain the heating rate of 1.5 K/min as soon as there is a compensation of the vapor loss that occurs in the heating process as a result of the release of water of crystallization during calcination. This is in particular the case when the aqueous sulfuric acid has to be heated up together with the introduced dispersion of calcium sulfate dihydrate.

The reaction is favored if the calcium sulfate dihydrate has a grain size of 250 $\mu$m or less. For this purpose the calcium sulfate dihydrate generated in flue-gas desulfurization should be calcined immediately since in this case the above-mentioned requirement of fine grain size can be satisfied without additional measures inasmuch as the formation of conglomerates, partial drying and the like have not yet occurred. Furthermore, the temperature of the flue-gas gypsum, i.e. of the calcium sulfate dihydrate, can be utilized in the process.

In accordance with still another feature of my invention, the calcining procedure is interrupted at 90° C. whereupon the calcium sulfate hemihydrate is separated from the aqueous sulfuric acid. For this purpose conventional filters, centrifuges or pushers are employed whereby a perfect separation of the two media is assured. After filtration, the calcium sulfate hemihydrate can be neutralized with calcium carbonate and dried at preferably 115° C. In this form the product is suitable for a variety of uses, in particular as a dam-construction material in mining.

If certain crystal structures of the calcium sulfate hemihydrate produced by this process are desired, selected additives can be admixed with the aqueous sulfuric acid and/or with the dispersion; such additives include aluminum sulfate, potassium alum, potassium sulfate or the like.

For preventing or limiting the formation of anhydrite II in accordance with a further feature of my invention, the calcining of the calcium sulfate dihydrate in aqueous sulfuric acid may proceed in the presence of sulfuric salts. Surprisingly, in this way the calcining effect can be substantially improved so that with lower energy expenditures a calcining of the chemical gypsum dihydrate or the flue-gas-desulfurization gypsum dihydrate is possible without undesired side effects. In particular, the proportion of anhydrite II, which negatively influences the structural properties of the alpha gypsum hemihydrate, is negligible in the final product.

It is known to calcine chemical gypsum or flue-gas-desulfurization gypsum to alpha gypsum hemihydrate in aqueous solutions of salts of sulfuric acid. Upon replacement of the sulfuric acid by certain sulfuric salts, or vice versa, only an interchange of the effects of the corresponding components takes place. If, however, the sulfuric acid is in part substituted by certain sulfuric salts or if aqueous sulfuric acid and sulfuric salts in combination are employed, then it turns out surprisingly that thereby the formation of anhydrite II can be excluded for practical purposes. Furthermore, the formation of alpha gypsum hemihydrate is possible under thermodynamically more favorable conditions, i.e. at a lower temperature as compared with the utilization of the individual components. This is obviously due, essentially, to a synergistic effect through the combination of aqueous sulfuric acid and a salt of sulfuric acid. The process according to my invention can advantageously be performed with the calcium sulfate dihydrate calcined in aqueous solution of sulfuric acid and 5 to 10 weight percent of aluminum sulfate octadecahydrate. The relatively small amounts of this sulfuric salt provide thermodynamically more favorable conditions and prevent the formation of anhydrite II.

The calcium sulfate dihydrate could also be calcined in an aqueous solution of sulfuric acid and 7.5 to 15 weight percent of potassium aluminum sulfate dodecahydrate.

Also, a variant of the process designed to improve the thermodynamic conditions and to prevent the formation of anhydrite II involves calcination of the calcium sulfate dihydrate in an aqueous solution of 20 weight percent of sulfuric acid and 7.5 to 15 weight percent of magnesium sulfate heptahydrate.

For further optimization I may calcine the calcium sulfate dihydrate in an aqueous solution of sulfuric acid and 5 to 10 weight percent of aluminum sulfate octadecahydrate and 7.5 to 15 weight percent of magnesium sulfate heptahydrate. Thus it is possible to substitute one component by another component or, alternatively, to employ both in equal amounts.

Any blooming effects can be avoided by employing sulfuric salts of magnesium; the elastomechanical behavior of the final product can be improved by admixing magnesium oxide with the alpha gypsum hemihydrate before and/or after drying. I have found it advantageous to admix 2.5 to 6, preferably 3.5, weight percent of magnesium oxide with the alpha gypsum hemihydrate. Besides avoiding the occurrence of blooming, the admixture of magnesium oxide can surprisingly also achieve a substantial increase in the heat-storage capacity as well as a reduction in the thermal conductivity of the material.

In a plant suitable for performing the process according to my invention, at least three converters are coupled to a reactor battery and are successively charged, heated and discharged. The coupling of the three converters to one another achieves a quasi-continuous process, since always one of the converters is in the state of being charged, of being heated and of being discharged. Via corresponding electronic circuits the course of the process can be so controlled that both the charging and the production of calcium sulfate hemihydrate are nearly continuous.

A good mixing is assured if each converter is provided with a stirrer.

The energy or heat input required for the calcining is particularly uniform and intensive in a plant where the heat carrier is fed into a circular tube with upwardly directed nozzles, disposed at the level of a discharge funnel. The steam or hot air then bubbles from below through the dispersion of aqueous sulfuric acid and calcium sulfate dihydrate so that the individual regions are provided with the necessary heat with simultaneous loosening up.

In order to divide the process into calcining and regeneration of the aqueous sulfuric acid, each converter should be preceded by a concentrator. In this concentrator the aqueous sulfuric-acid dispersion is regenerated by introduction of waste heat and heated to such an extent that upon introduction of the calcium sulfate dihydrate at least the dissociation temperature is reached in the converters.

With uniform heating up of the aqueous sulfuric-acid dispersion it is desirable, as already noted, to avoid the formation of larger bubble configurations in the concentrator. This is effectively achieved by disposing within the concentrator, above the input for the waste heat, a tube ending below the level of the dispersion. The waste-heat carrier, specifically hot air or water vapor, is so led into the dispersion via the tube disposed therein that both rise at about the same speed, the dispersion being then returned between the inner tube and the wall of the concentrator. The tube and the concentrator are so dimensioned and correlated with the planned gas speed that liquid and gas, as mentioned, are moving at about the same speed in the inner tube.

The liquid is transported in the inner tube by means of the rising gas bubbles. This, in general, also holds for the return flow of the liquid and the dispersion; the liquid flow can be further enhanced by disposing one or more pumps between the walls of the tube and the concentrator.

The separation of the solid particles from the aqueous sulfuric acid and from the sulfuric salts after the calcination is greatly simplified by associating a centrifuge with the converters and concentrators. Since the three interconnected converters and concentrators operate in a cycle and thus only one converter contains calcined product at any instant, a single centrifuge will suffice for the entire reactor battery. It is also possible, however, to form the lower part of each converter as a centrifuge or to associate a centrifuge therewith in order to be able to operate the individual parts of the reactor battery independently of one another.

The formation of anhydrite II is largely avoided by performing the entire process at low temperatures. The anhydrite represents an extremely slowly reacting compound which must be specially activated for a binding reaction and which therefore entails not only a cost increase of the product but also a complication of the process. A high-quality product can be obtained by the addition of magnesium oxide, which also satisfies exacting requirements of further processing.

BRIEF DESCRIPTION OF THE DRAWING

Further features of my present invention will become apparent from the accompanying drawing wherein.

SPECIFIC DESCRIPTION

Figure 1:
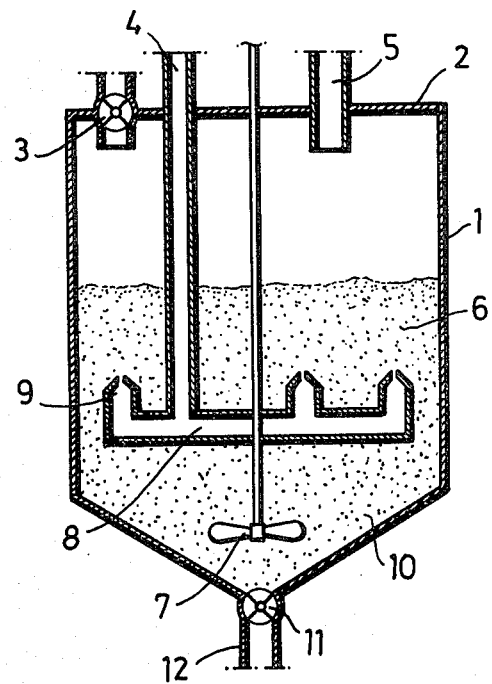
FIG. 1 is a sectional view of a converter.

A plant for implementing the method according to my invention comprises three converters 1, one of which is shown in FIG. 1. A representative concentrator 15 is shown in FIG. 2.

A gate 3 for the introduction of calcium sulfate dihydrate, a heating-gas line 4 and a discharge line 5 are provided in a cover 2 of the converter 1. The calcium sulfate dihydrate is fed in via the gate 3 in such a quantity, together with aqueous sulfuric acid and sulfuric salts, that 50 to 60 percent of the total volume is filled. The resulting dispersion, designated 6, is homogenized by a stirrer 7 disposed below a circular tube 8 with nozzles 9 and above a discharge funnel 10. Via a gate 11 and a discharge device 12, calcium sulfate hemihydrate is withdrawn as a final product.

A quasi-continuous mode of operation with three converters 1 is assured by filling one converter, heating an already filled second converter by introduction of a fly-ash-free waste-heat carrier, and withdrawing from a third converter the sedimented product which is thereafter separated from the reaction medium with filters, centrifuges or pushers when it has reached a temperature above 363 K. The resulting reaction medium is fed back to the first converter together with the reaction medium remaining in the third converter. The final product is neutralized with powdered calcium carbonate and then dried with waste heat at 378 to 403 K, preferably 388 K, or is possibly processed wet.

Figure 2:
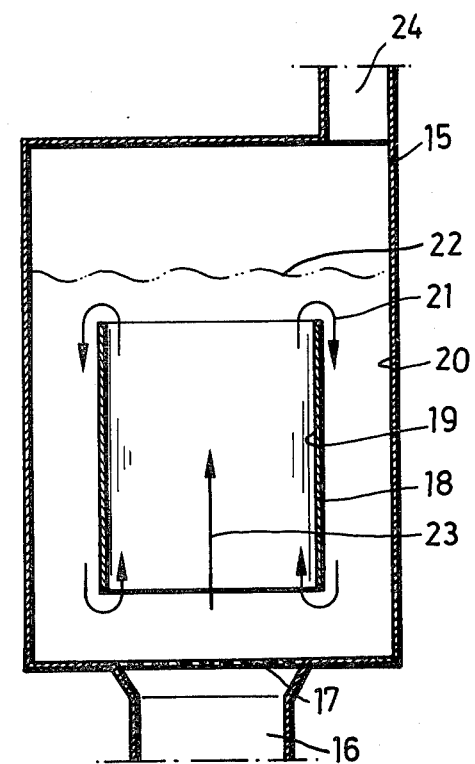
FIG. 2 is a sectional view of an associated concentrator.

FIG. 2 shows the concentrator 15, associated with the converters 1, wherein the aqueous sulfuric-acid dispersion with the sulfuric salts is regenerated. For this purpose a waste-heat carrier such as water vapor, hot air or flue gas is gated into the interior of the concentrator 15 via an inlet 16 and a sieve plate 17. The concentrator 15 is internally provided with a tube 18 which is located exactly above the sieve plate 17 and the inlet 16 for avoiding that the blown-in heating gas prematurely forms larger bubble configurations tending to impair the heat transfer as discussed above. A flow of dispersion gas 23 is generated by the introduced waste heat, this flow and the gas having approximately the same speed.

The tube 18 ends slightly below the level of the dispersion 22 whereby the gas flow 23 can be reconverted into a liquid stream 21 flowing back between tube wall 19 and concentrator wall 20 toward the sieve plate 17. The waste-heat carrier leaves the concentrator 15 via an exit port 24.

EXAMPLE I 5 liters of a 20-weight-percent dispersion of calcium sulfate dihydrate of a grain size of less than 250 μm in 20 weight percent sulfuric acid was heated by air of 120° C. from 45° C. to 95° C. at a rate of 1.5 K/min in a laboratory converter with a capacity of 10 liters.

After reaching a temperature of 95° C., the reaction product was separated from the mother liquor and was tested by way of X-ray structure analysis after drying at 115° C. The reaction product was free of calcium sulfate dihydrate. The bulk of the reaction product comprised calcium sulfate hemihydrate besides a very small part of anydrite III and traces of anhydrite II.

After drying, the calcium sulfate hemihydrate is present as a fine-grained material which can be transported in bags as well as in containers and can then, for example, be blown out below ground in gallery-bounding dams or similar regions, with the addition of water. The final product reaches high strength very early, is easily wettable and develops little dust, being thus well suited for these fields of application. The material can be employed as pure hemihydrate or in mixtures with similar dam-construction materials.

EXAMPLE II 15 kg of waste calcium sulfate dihydrate was dispersed in 45 liters of a solution of 15 weight percent magnesium sulfate heptahydrate and 20 weight percent sulfuric acid in water at 368 K for a time of 30 minutes.

Then the deposited material was separated from the mother liquor by centrifugation and was dried at 378 K after neutralization with calcium carbonate.

The yield was 12.3 kg of alpha gypsum hemihydrate. This material was analyzed and found to have the following characteristic components:

alpha $CaSO_4 \times \frac{1}{2} H_2O$—98.3 weight percent
$CaSO_4$ II—0.17 weight percent
$MgSO_4 \times 7H_2O$—1.4 weight percent In the processing of the alpha gypsum hemihydrate, 3.5 weight percent of magnesium oxide was added whereby a blooming-free final product was obtained.

I claim:

1. A method of converting calcium sulfate dihydrate recovered from flue-gas desulfurization in a power plant to fine-grain calcium sulfate hemihydrate, said method comprising the steps of:
   (a) heating an aqueous sulfuric-acid solution containing substantially 15 to 55% by weight sulfuric acid to a temperature such that with addition of calcium sulfate dihydrate the resulting dispersion will have a temperature above the decomposition temperature of calcium sulfate dihydrate to calcium sulfate hemihydrate;
   (b) introducing into the heated sulfuric-acid solution calcium sulfate dihydrate crystals of grain size of at most 250 microns to form a dispersion containing 10 to 50% by weight of the calcium sulfate dihydrate thereof;
   (c) continuously stirring the dispersion of step (b) to decompose the calcium sulfate dihydrate and precipitate fine-grain calcium sulfate hemihydrate;
   (d) separating the fine-grain calcium sulfate hemihydrate formed in step (c) from the sulfuric-acid solution therein;
   (e) reheating the sulfuric-acid solution separated from the calcium sulfate hemihydrate in step (d) by bubbling flue gas from said power plant through said sulfuric-acid solution to evaporate water and returning the heated solution to step (b) for further decomposition of calcium sulfate dihydrate and repeating steps (b) through (e) therewith; and
   (f) drying the fine-grain calcium sulfate hemihydrate crystals separated from the solution in step (d).

2. The method defined in claim 1, further comprising the step of modifying the crystal structure of the calcium sulfate hemihydrate which is recovered by adding to the dispersion to 7.5 to 15% by weight of potassium aluminum sulfate dodecahydrate, 7.5% to 15% by weight magnesium sulfate heptahydrate or 5 to 10% by weight aluminum sulfate octadecahydrate.

3. The method defined in claim 1, further comprising mixing with the recovered calcium sulfate hemihydrate an amount of, 2.5 to 6% by weight magnesium oxide.

4. The method defined in claim 1 wherein the concentration of sulfuric-acid solution fed to step (b) is 15 to 25% by weight sulfuric-acid and the dispersion formed in step (b) contains about 20 weight percent calcium sulfate dihydrate.

5. A method of converting calcium sulfate dihydrate recovered from flue-gas desulfurization in a power plant to fine-grain calcium sulfate hemihydrate, said method comprising the steps of:
   (a) forming a dispersion of 10 to 50% by weight calcium sulfate dihydrate having a grain size of at most 250 microns in aqueous sulfuric acid having a concentration of substantially 15 to 55% sulfuric acid;
   (b) heating said dispersion at a rate of substantially 1 to 3 K per minute by bubbling flue gas from said power plant through said dispersion to raise the temperature thereof to a level above the decomposition temperature of calcium sulfate dihydrate to calcium sulfate hemihydrate while continuously stirring said dispersion, thereby transforming the calcium sulfate dihydrate into fine-grain calcium sulfate hemihydrate;
   (c) recovering the fine-grain calcium sulfate hemihydrate formed in step (b); and
   (d) drying the recovered fine-grain calcium sulfate hemihydrate.

6. The method defined in claim 5, further comprising mixing with the recovered calcium sulfate hemihydrate an amount of, 2.5 to 6% by weight magnesium oxide.

* * * * *